(12) United States Patent
Myers et al.

(10) Patent No.: US 6,485,773 B1
(45) Date of Patent: Nov. 26, 2002

(54) SEMEN TASTE-ENHANCEMENT DIETARY SUPPLEMENT

(75) Inventors: Brent Richard Myers, Apache Junction, AZ (US); Lois Kay Myers, Apache Junction, AZ (US)

(73) Assignee: Brent R. Myers, Apache Junction, AZ (US)

( * ) Notice: Subject to any disclaimer, the term of this patent is extended or adjusted under 35 U.S.C. 154(b) by 0 days.

(21) Appl. No.: 09/683,503

(22) Filed: Jan. 9, 2002

Related U.S. Application Data

(60) Provisional application No. 60/260,853, filed on Jan. 11, 2001.

(51) Int. Cl.[7] .............................. A23L 2/38; A23L 2/00; A23L 1/30; A61K 47/00; A61K 9/20

(52) U.S. Cl. ..................... 426/598; 426/599; 426/73; 424/439; 424/464; 424/465; 424/451; 424/725; 424/756; 424/739

(58) Field of Search ................................ 424/439, 442, 424/451, 489, 464, 465, 725, 756, 739; 426/598, 599, 93

(56) References Cited

U.S. PATENT DOCUMENTS 5,202,122 A * 4/1993 Graves et al. ........... 424/195.1

* cited by examiner

Primary Examiner—Thurman K. Page
Assistant Examiner—Humera N. Sheikh

(57) ABSTRACT

The present invention is directed towards a powdered dietary supplement formulation consisting essentially of a combination of freeze-dried fruits, vegetables and spices, wherein the formulation is prepared as a drink, tablet or capsule. The tablet may also be in chewable form.

3 Claims, No Drawings

SEMEN TASTE-ENHANCEMENT DIETARY SUPPLEMENT

This application is a non-provisional of Provisional No. 60/260,853, filed Jan. 11, 2001, pending.

BACKGROUND OF INVENTION

This invention regards a dietary supplement formulation that significantly improves the taste of the male ejaculate.

While certain ingredients have previously been believed in "urban-myth" fashion to improve semen taste, there has never been a precedent for any formulation developed or marketed for this purpose. Further these urban myths, while containing a grain of truth, required that a full year of investigation and research and development, and almost an additional year of market testing be conducted prior to successfully establishing the most effective formulation and concentration of specific ingredients to produce the optimal results ultimately achieved.

These optimal results were discovered only after experimenting with certain freeze-dried fruit and vegetable powders combined with specific spices. Certain vitamins and minerals were additionally added to replenish in the male those nutrients lost via ejaculation.

SUMMARY OF INVENTION

This invention regards a novel and unobvious dietary supplement formulation of relatively specific ratios of fruits, vegetables, and spices that when ingested by the male results in a significant improvement to the taste of the male ejaculate by reducing its generally salty and/or bitter taste while also adding a pleasant flavor that is considered by 98.5% of all customers as very enjoyable.

This formulation of ingredients can take many product forms including but not limited to a drink powder, tablet, chewable tablet, or capsule form.

DETAILED DESCRIPTION

During the research and development phase of this invention, it was discovered that pineapple juice and broccoli were only slightly effective in improving semen taste, regardless how much of either or both were ingested. As a result, powder concentrates of both ingredients were tested, with only slightly better results. Finally, freeze-dried forms of these same ingredients were tried with significantly improved results. As certain other fruits and vegetables were also somewhat effective in improving taste results, banana, celery, and strawberry/cherry were also ultimately selected and added to the formulation. The cumulative effects of these five ingredients in freeze-dried form produced greatly improved semen-taste results. Further research and testing resulted in discovering that three specific spices (Ginger, Cinnamon, and Nutmeg) were successful in neutralizing the generally salty/bitter taste usually attributed to the male ejaculate. As a result, these three spices were also added to the invention formulation in optimal ratios, as determined during our research and development.

Further investigation via several nutritional books revealed that semen naturally contains such important nutrients as Calcium, Magnesium, Creatine, Zinc, Selenium, and Vitamins B6, B12, and E. As ejaculation understandably depletes the male body of these nutrients, it was determined important to have this invention also assist the body in replenishing these nutrients by including safe quantities of these nutrients in with the invention formulation. However, these nutrients do not appear to have any effect on semen taste and no claim to this effect is being made herein.

Following this, marketing testing began with 27 local couples of different ages, races, and health regimens (e.g. smokers/non-smokers, drinkers/non-drinkers, healthy/not-so-healthy lifestyles and diets). Questionnaires were created and used for data collection by said couples and, after several months, the data was examined. The results were highly positive, clearly indicating that regardless of the lifestyles of the couples, significant semen-taste improvement was experienced by all in the market-test group. Subsequent to this, the product was placed on the market where after thousands of orders and with a 100% Money-back Guarantee, less than 1.5% return of product has been experienced.

This invention is currently marketed as a drink powder. However this invention can be processed and packaged in a wide variety of product forms (e.g. tablets, chewable tablets, capsules) and this document does not attempt in any way to limit this invention's product form to only that of a drink powder. The ratios and ingredients herein defined are applicable for whatever product form desired. In keeping with this, here follows the Invention Formulation:

[Invention Formulation]

| Percent / mg Ranges | Ingredient |
| --- | --- |
| 38–41% | Freeze-dried Pineapple Juice |
| 12–14% | Freeze-dried Banana Powder |
| 7–9% | Freeze-dried Broccoli Powder |
| 5–7% | Freeze-dried Celery Powder |
| 5–7% | Freeze-dried Strawberry or Cherry Juice Powder |
| 5–7% | Cinnamon Powder |
| 5.5% - up to 1143 mg | Calcium Powder |
| 1.9%.- up to 400 mg | Magnesium Powder |
| 1.2–2% | Ginger root Powder |
| 1.2–2% | Nutmeg Powder |
| 1.0% - up to 200 mg | Creatine Powder |
| .5% - up to 100 mg | Zinc AAC 20% |
| ≦30 mg | Selenium AAC 0.2% |
| ≦6 mg | Vitamin E |
| ≦2.5 mg | Vitamin B6 |
| ≦.5 mg | Vitamin B12 |
| Total: 21–22 grams - in Powder Drinkform | |

As a powder, this invention (said formulation of ingredients) is then professionally mixed and blended together using commercial equipment currently in use by FDA-approved nutritional products manufacturing facilities. As such it is in powder-drink form and can then be packaged accordingly. Should it be desired to process said formulation into different final product forms (e.g. tablets, chewable tablets, capsules), currently established processing means to such ends can take place with no further modifications or clarification needed to this invention.

This invention, as a drink powder, is used in the following manner: 1. About an hour or so before bed, the male user should ejaculate at least once before taking the invention. 2. Shortly thereafter, the male user pours 21–22 grams of invention into a container of 6 ounces (175 ml) of water. 3. The male user then closes the container with a lid and shake contents vigorously. 4. The male user then drinks contents.

While the invention will enhance semen taste in as little as 12–24 hours, it is recommended that, so as to allow the male physiology time to produce more semen while benefiting from the invention's attributes, the male user repeat Steps 2–4 for an additional one to two nights.

Once ingested, this invention will positively effect a change in semen taste for a period of approximately 24 hours, thereafter. Thus it is recommended that for as long as semen-taste enhancement is desired, this invention (21–22 grams of powder as previously defined and described) should be used no less than once and no more than twice during any 24-hour period.

No negative effects were experienced by any in the market-test group nor by any of the thousands of customers who have used this product, thus far. This product is marketed as safe to all save those with either a glucose sensitivity or intolerance, or those with an allergy to one of the ingredients used in this invention.

What is claimed is:

1. A powdered dietary formulation consisting essentially of:
   a. 38–41% Freeze-dried Pineapple Powder;
   b. 12–14% Freeze-dried Banana Powder;
   c. 7–9% Freeze-dried Broccoli Powder;
   d. 5–7% Freeze-dried Celery Powder;
   e. 5–7% Freeze-dried Strawberry or Cherry Powder;
   f. 5–7% Cinnamon Powder;
   g. up to 1143 mg Calcium Powder;
   h. up to 400 mg Magnesium Powder;
   i. 1.2–2% Ginger Root Powder;
   j. 1.2–2% Nutmeg Powder;
   k. up to 200 mg Creatine Powder;
   l. up to 100 mg Zinc AAC 20%;
   m. up to 30 mg Selenium AAC 0.2%;
   n. up to 6 mg Vitamin E;
   o. up to 2.5 mg Vitamin B6; and
   p. up to 0.5 mg Vitamin B12.

2. The formulation of claim 1 prepared as a drink, tablet, or capsule.

3. The tablet of claim 2 wherein the tablet is a chewable.

* * * * *